March 19, 1957  C. J. STEFAN  2,785,661
HYDRAULIC MECHANISM VALVE
Filed March 31, 1954  3 Sheets-Sheet 3
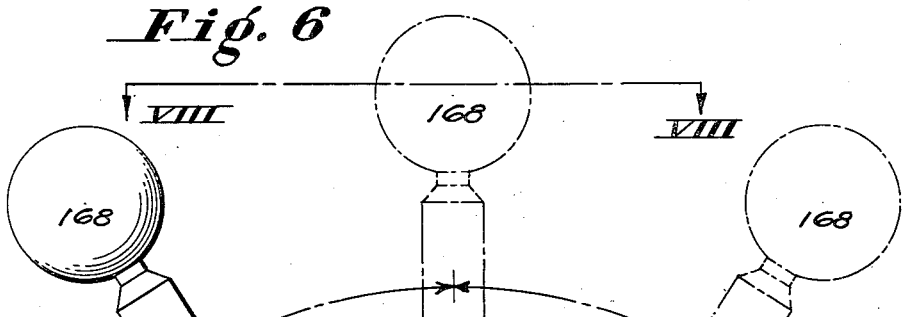
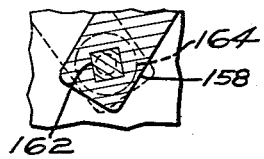
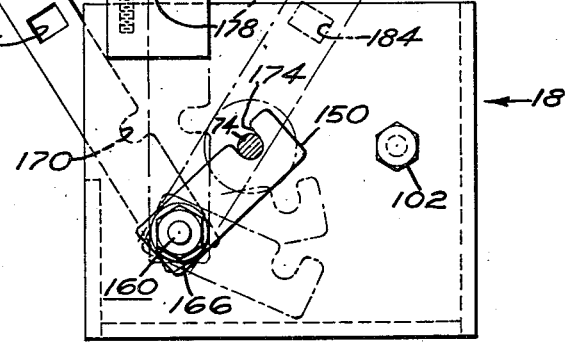
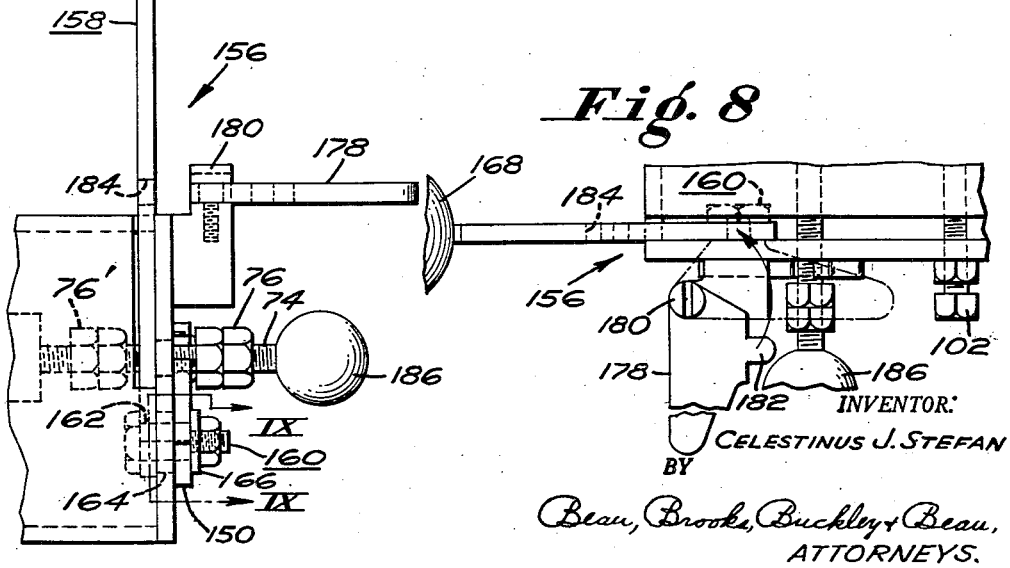
INVENTOR:
CELESTINUS J. STEFAN
BY
Beau, Brooks, Buckley & Beau,
ATTORNEYS.

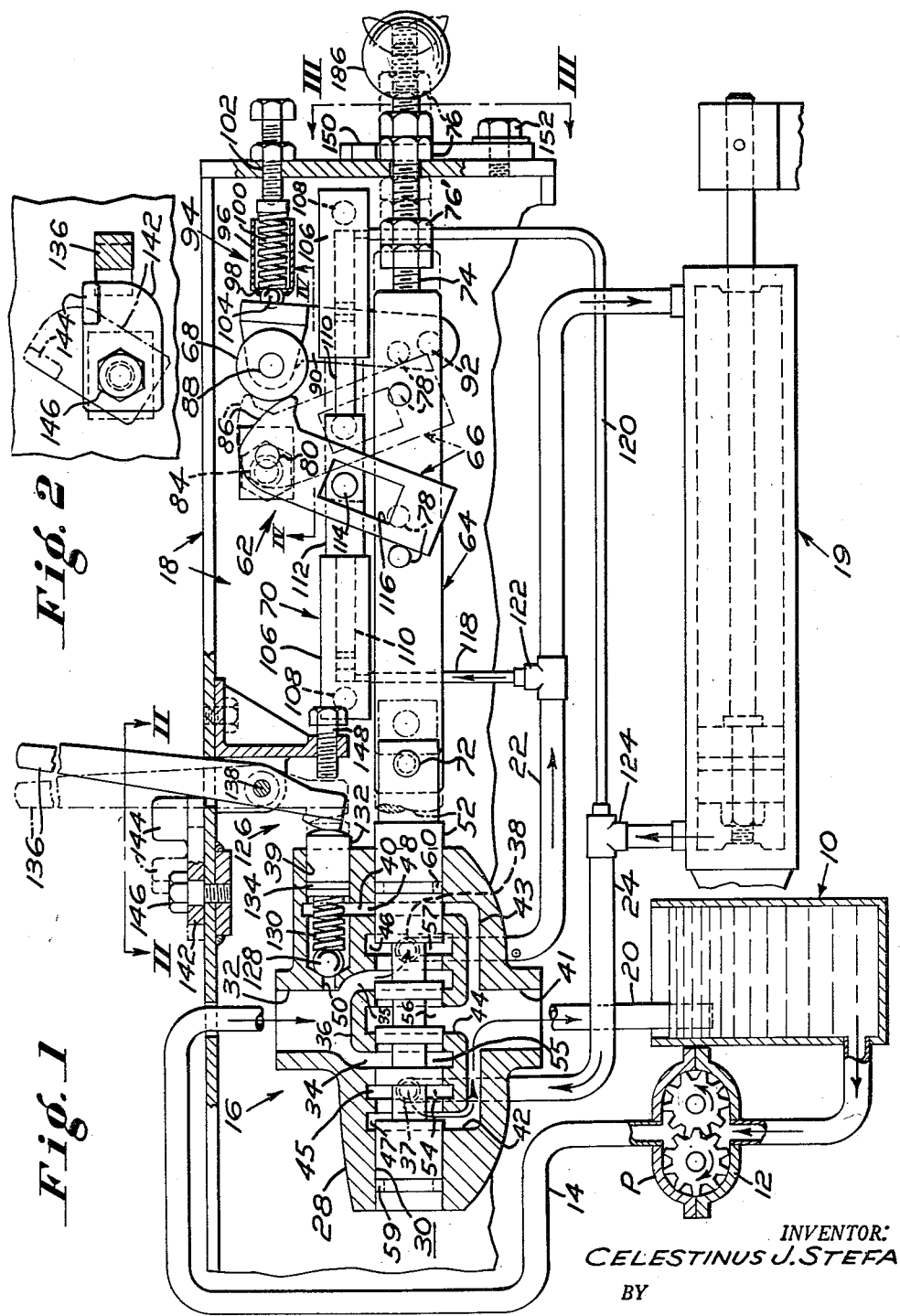

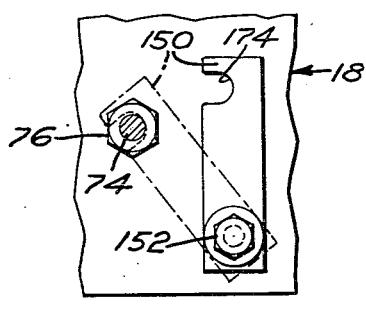
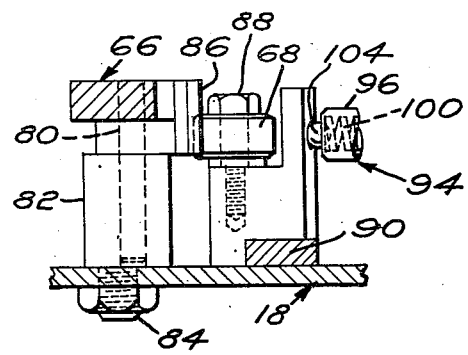
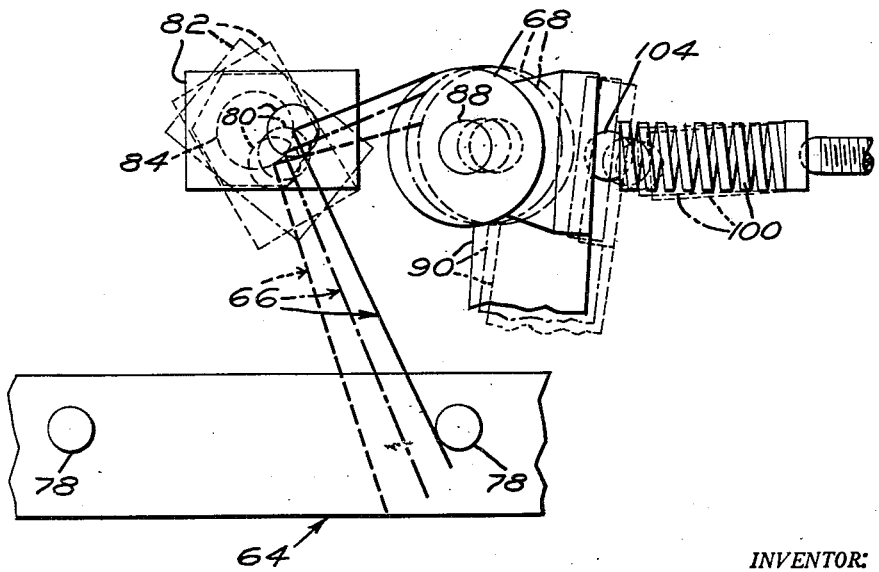

United States Patent Office 2,785,661
Patented Mar. 19, 1957

2,785,661

HYDRAULIC MECHANISM VALVE

Celestinus J. Stefan, Arcade, N. Y.

Application March 31, 1954, Serial No. 420,034

11 Claims. (Cl. 121—150)

This invention relates generally to hydraulic apparatus and more particularly is directed to improved fluid-flow control means therefor.

A particular object of the invention is to provide an improved adjustable flow control device for reversing fluid flow through a flow-reversing valve in a hydraulic apparatus.

Another object of the invention is to provide a device of the aforesaid type which will be automatically operable responsive to pre-selected hydraulic system pressures, whereby it will cause inactivation of a hydraulic drive means of the system by automatically alternately reversing a flow-reversing valve thereof in the event of obstruction of the drive means.

Yet another object of the invention is to provide an improved manually adjustable pressure relief device in combination with the aforesaid flow control device, the former being pre-set to "blow" at some maximum pressure greater than normal operational pressures to which the flow control device will automatically respond so as to insure maximum protection against pressure overloads while at the same time permitting selective bleeding of fluid working pressure to regulate operation of a system embodying the invention.

Still another object of the invention is to provide an improved overbalance control arrangement in combination with the aforesaid devices which is adapted for use as a master control for locking a flow-reversing valve in its neutral or flow by-pass position in a system employing an apparatus of the invention for intermittent service operation.

Still another object of the invention is to provide an adjustable flow control device which may be made selectively responsive to unbalanced working pressures so that hydraulic drive means may be made to provide desired reciprocating drive action even under unbalanced load conditions and system inefficiency.

Further objects and advantages of the invention will be apparent from the following description.

Fig. 1 is a diagrammatic view of a hydraulic system embodying the invention, a control mechanism therefor included in said system being shown partially in section;

Fig. 2 is a fragmentary view taken generally along the line II—II of Fig. 1;

Fig. 3 is a fragmentary view taken generally along the line III—III of Fig. 1;

Fig. 4 is a fragmentary view taken generally along the line IV—IV of Fig. 1;

Fig. 5 is a fragmentary view of a detail diagrammatically indicating the result of eccentrically adjusting one of the parts thereof;

Fig. 6 is a view similar to Fig. 3 taken generally along the line III—III of Fig. 1, but being rotated through 90 degrees therefrom to show an overbalance control arrangement of the invention;

Fig. 7 is a fragmentary side view of the arrangement of Fig. 6;

Fig. 8 is a fragmentary view taken generally along the line VIII—VIII of Fig. 6; and Fig. 9 is a fragmentary view taken along the line IX—IX of Fig. 7.

Referring more particularly to the drawing (Fig. 1), the invention is shown to be embodied in connection with a hydraulic system including generally a fluid supply reservoir 10, a power-operated pump 12 which is disposed in a reservoir outlet line 14, a pressure-fluid diverting valve mechanism designated generally at 16 which is suitably mounted in a casing member 18, and a fluid drive motor 19. The fluid diverting mechanism 16, when in what will hereinafter be called its "neutral" position, will selectively channel the pressure fluid from the reservoir outlet line 14 through a reservoir inlet line 20 and back into the reservoir 10, whereas in normal operation, as for example, when actuated by a pressure-responsive control means of the type hereinafter described, the pressure fluid will be channelled thereby alternately through a pair of fluid motor supply lines 22 and 24 to cause the fluid motor 19 to do work.

The valve 16 comprises a cored housing member 28 having a horizontal chamber 30 in communication with a pressure inlet port 32 through a pair of passages 34 and 35 disposed about a central core portion 36, the passage 34 being hereinafter termed the forward motor drive passage while the passage 35 is termed the rearward motor drive passage. The chamber 30 also communicates with a pair of motor supply line ports 37 and 38, with a relief valve bore 39 through a port 40, with an outlet port 41 through the passageways 42, 43 and 44, and with a plurality of annular grooves 45 to 48, inclusive, extending radially outwardly of said chamber.

It will be understood that the groove 47 is in communication with the passageway 42 which will be hereinafter called the rearward stroke reservoir spillway and that the groove 48 is in communication with the passageway 43 and the relief valve bore port 40 to provide what will be hereinafter called a forward stroke reservoir spillway under normal operative conditions and a relief valve spillway during operation of the hereinafter described relief valve mechanism to permit bleeding of the inlet port fluid pressure through a port 50 at the bottom of the relief valve bore 39.

A spool member 52 is disposed for movement in the horizontal chamber 30 to alternately channel the pressure fluid from the power driven pump to opposite ends of the fluid motor shown in the drawings. The spool member 52 is provided with a plurality of longitudinally spaced annular grooves 54 to 57, inclusive, and a pair of longitudinally spaced oil seal rings 59 and 60 may be fitted on the ends thereof as is customary in the art. The spool grooves serve to connect certain of the grooves 45 to 48 and the passages 34 and 35 in various positions of adjustment of the spool 52 to direct the flow of the inlet pressure fluid.

In the position shown in Fig. 1, the spool 52 will direct the fluid supplied by the pressure source to the inlet port 32, through the rearward motor drive passage 35 into the motor supply line 22 in the direction of the arrows whereupon, as for example, it acts against a piston of a fluid motor of the piston and cylinder type as shown causing it to move rearwardly and to simultaneously force the fluid behind it through line 24 into the backward stroke reservoir spillway 42 and then through the line 20 into the reservoir. On the other hand, movement of the spool 52 a suitable distance to the right of the position shown in Fig. 1 will direct the fluid supplied by the pressure source to the inlet port 32, through the forward motor drive passage 34 into the motor supply line 24 in a direction opposite that indicated by the arrows, thus driving the motor piston forwardly and forcing the fluid in front of it through the line 22 in a direction opposite that indicated by the arrows and then through the forward stroke reservoir spillway 43 and the line 20 into the reservoir. Intermediate these forward and rearward motor drive spool positions is a "neutral" position putting the inlet port 32 into communication with the outlet port 41 through the passageways 34, 35, 44 and the chamber 30 whereby the pressure fluid is channelled back into the reservoir.

A particular feature of the invention lies in providing an adjustable pressure-responsive control mechanism as indicated generally at 62 for controlled automatic movement of the spool member 52. The control mechanism particularly illustrated in Fig. 1 includes a shipper rod 64, a pivoted shipper rod actuating member 66, a floating spring-pressed roller 68, and a pressure-responsive control mechanism 70.

The shipper rod 64 is connected to the spool member at 72 and has an elongate threaded portion 74 which is disposed through the wall of the casing 18 and has pairs of longitudinally spaced stop nuts 76—76' thereon disposed on both sides of the casing wall to define the aforesaid motor drive spool position limits and is also provided with a pair of longitudinally spaced shipper rod drive lugs 78—78.

The shipper rod actuating rocker member 66 as shown in Figs. 1 and 4 is pivotally mounted at one end by means of an integral pin 80 which is journalled in a spacer mounting member 82 fixed to the casing 18 as by an integral stud and nut portion as indicated at 84. It is noted that the pivot pin 80 is preferably eccentrically positionally related relative to the axis of the spacer mounting member stud portion for adjustment purposes to be hereinafter more fully discussed. The lever member 66 shown in the drawing is provided at its pivoted end with projecting cam means as indicated at 86 and its opposite end lies between and engages the aforesaid shipper rod drive lugs 78—78 near the radial positional limits of its swing.

The floating spring-pressed roller 68 is arranged to bear against the cam means 86 in the illustrative embodiment herein described (Figs. 1 and 4) by being rotatably mounted as at 88 on a lever arm member 90 which is pivotally connected at 92 to the casing 18 and which is spring-urged against the cam means at the roller mounting end by a compression spring means indicated generally at 94. Or, the connection at 92 may be an eccentric pivot device while the connection at 80 may be a simple pivot.

The compression spring means 94 shown in the drawing comprise generally a tubular spring housing 96 having an inwardly projecting annular rim portion 98 and a compression spring 100 which is fixed at one end to the casing 18 wall as at 102 and bears at its opposite end against a ball member 104 which presses against the roller mounting end of the lever 90.

The pressure-responsive control mechanism 70 is shown in the drawing to comprise a pair of fluid motors 106—106 of the piston and cylinder type fixed to the casing 18 as at 108—108 and having their respective piston drive arms 110—110 interconnected by a coupling member 112 which has an integral normally related pin portion 114 which is adapted to engage the rocker member 66 intermediate its ends in lost motion connection as for example in any suitable slot therein as shown at 116.

A pair of fluid conductors 118 and 120 tap off the main fluid motor supply lines 22 and 24 as indicated at 122 and 124, respectively (Fig. 1), and communicate with the ends of the fluid motors 106—106. Thus, it will be appreciated that the rocker member 66 will be urged to overcome the roller pressure on its cam portion by a force generated in the motor 106 proportional to the pressure in the supply lines 22 and 24 in a direction depending upon the direction of fluid pressure therein.

It is to be understood that during a drive stroke of the main fluid motor 19 the spring-urged roller 68 shall bear against the rocker cam 86 with a force great enough to retain the rocker member 66 against the force applied thereto positionally eccentrically of the rocker pivot axis by the interconnected fluid motors 106—106 which tend to cause pivotal movement about the pivot pin 80, whereas, at the drive limits of the main fluid motor responsive to the increased pressures therein, the spring pressure on said roller will be overcome and the rocker member will be tripped. As a result, the shipper member 64 will be alternately shifted a suitable distance depending upon the dimensions and spacing of the rocker member and the engaged shipper member lugs 78—78 whereby the hydraulic oil flow reversing unit 16 herein particularly described will be actuated to reverse the main fluid motor in the hereinabove described manner. Thus, the pressure-responsive unit 62 functions to automatically alternately reverse a fluid reversing valve of the type indicated at 16 responsive to pressures in a hydraulic system of the hereinabove noted type.

A particular feature inherent in a pressure-responsive control unit of the invention is that any hydraulic mechanism controlled thereby is automatically protected against structural failures and damage of parts, or the like, as where a portion of the mechanism is inadvertently or accidentally blocked since, in that event, the build-up of pressures in the mechanism will automatically cause alternate reversals of the control unit and thus maintain the pressures at safe values not exceeding those required to trip the control unit, as for example, at the limits of piston travel in the main fluid motor hereinabove described, and to simultaneously act as a warning device to indicate trouble in the driven mechanism.

Another feature of the invention is particularly illustrated at 126 in Fig. 1 to comprise a manually operable control means which provides manual control of the speed and movement of the main fluid motor drive 19, and also functions at a predetermined fixed setting as a pressure relief valve to provide additional protection against overloads in a hydraulic system such as herein particularly described as by setting the valve to "blow" at a safe maximum pressure greater than that required to trip the pressure-responsive control means hereinabove described.

The manual control means 126 includes a ball member 128 which is seated at the port 50 in the bottom of the relief valve bore 39 and is normally retained thereat in oil seal engagement by the force of a compression spring 130. The compression spring 130 is then backed at a point rearwardly of the relief valve spillway aperture 40 by a piston member 132 having a ring oil seal 134 and being in sliding oil seal engagement with said relief valve bore. The piston member 132 is then retained against the spring 130 pressure by contact with one end of a lever arm member 136 which is pivotally mounted at 138 intermediate its ends on the casing 18.

A cam member 142 having an upstanding integral grip lug 144 thereon is pivotally connected to the casing 18 by means of a shouldered screw 146 (Figs. 1 and 2) and is adapted to cam the lever arm member 136, as for example, into the solid line position thereof shown in Figs. 1 and 2 being its hereinabove described relief valve "blow" position. An adjustable stop screw 148 is positionally fixed adjacent the lower end of the lever 136 where it contacts the aforesaid relief valve piston to adjustably limit movement thereof, as for example, to the dotted line position shown in Figs. 1 and 2 thereby permitting a fine manual screw adjustment of the lever positions within the range of pivotal movement thereof defined by the sides of the cam member 142. The cam member 142 may, of course, be stepped to be adapted for intermediate cam-lever adjustments as may be desired.

It is apparent that if fluid pressures in the inlet port become great enough to overcome the spring 130 force acting on the ball check valve 128, the check valve will open and pressure fluid will be diverted through the port 50, the relief valve bore 39 and then through the hereinabove described relief valve spillway into the fluid reservoir until the inlet port pressure drops to a value which will permit the spring 130 to again seat the ball check valve 128. By means of the hereinabove described lever arrangement, the compression of the spring 130 may be manually adjusted as desired for selective controlled "bleeding" of fluid pressure by simply grasping the handle portion of the lever 136 and pivotally releasing the cam 142 from its fixed maximum "blow" pressure position by means of the lug 144 thereof. Thus, selective controlled bleeding of the inlet pressure fluid may be utilized for speed control of the fluid drive motor, or to interrupt the action thereof at any drive position without tripping of the pressure-responsive control mechanism.

Still another feature of the invention lies in the provision of a spacer bar 150 pivotally connected to the casing 18 as indicated at 152 and being so dimensioned that when rotatably swung into engagement with the stud 74 portion of the shipper member it will block movement thereof at the hereinabove described neutral condition of the reversing valve unit for inactivation thereof when contacted by the stop nuts 76, thereby safely permitting repairs, or the like, to the system.

Still another feature of the invention lies in adjustably eccentrically mounting the rocker member 66 in the hereinabove described manner. Thus, positional adjustments of the cam means 86 relative to the roller 68, as for example, between the solid and broken line positions shown in Fig. 5 will relatively space the rocker member pivot axis, the lugs 78—78 on the shipper member, and the roller bearing so that any preferred pressure-reversing operation may be obtained.

It is apparent that the sizes of the fluid motor units 106—106 may alternatievly be varied relative to each other to accomplish the above result since, in that event the said motor units will act on the rocker member with relatively different forces. It is further apparent that the same result could also be accomplished as by varying the relative point of application of the individual motor unit 106—106 forces on the rocker member. Therefore, a valve control mechanism of the invention is adapted to be relatively inexpensively manufactured and is readily and easily adjusted for various purposes as above described.

As shown in Figs. 6, 7, 8 and 9, still another feature of the invention is to provide an overbalance control lever arrangement as indicated at 156. This arrangement comprises generally a control lever 158 which is mounted inwardly of the casing end wall by means of a bolt 160 and having the spacer locking bar 150 fitted thereto outwardly of the end wall in angularly related position relative to the member 158 and being rotatable therewith between end limits defined by contact of these members 150 and 158 with the shipper member stud 74 as hereinafter more particularly described. The bolt 160 will have a shank 162 preferably of square cross-sectional form so as to be adapted to be keyed through similarly shaped openings in the ends of the members 150 and 158 into the above described arrangement and through the center of a bushing-spacer pivot member 164 pivoted in the casing end wall as most clearly shown in Figs. 7 and 9. The pivot bushing 164 will preferably be slightly wider than the end wall thickness whereby a nut and washer 166 may be threaded over the end of the bolt 160 to lock the lever arrangement 156 adjacent the end wall in freely pivoting relation about the axis of the bolt 160.

The overbalance lever 158 will be provided with a weighted ball 168 at its upper end and preferably will have a side thereof notched near its lower end as shown at 170 so as to remain in engagement with the stud portion of the shipper member 64 by virtue of gravitational forces exerted on the lever, when in the dotted line position thereof shown at 172 in Fig. 6. Also, as shown in Fig. 6 the member 150 will be provided with a notch 174 so as to engage the stud portion 74 when the overbalance lever 158 is held by gravity in the solid line position thereof shown in Fig. 6. Further, it is apparent that when the lever 158 is retained in the vertical dotted line position thereof shown at 176 the shipper rod 64 will be free to respond to forces impressed thereon in the hereinabove described manner. Thus, it will be appreciated that the overbalance lever 158 may be allowed to gravitate into one of its end limit positions and thereby casue it or the spaced angularly related member 150 fixed thereto to selectively block the shipper member 64 by means of engagement with the pairs of spaced stop nuts 76—76' threaded thereon. It is a particular feature of this arrangement that the pairs of stop nuts 76—76' will be selectively spaced relative to the members 150 and 158 in order that the shipper member will be blocked in its hereinabove described "neutral" position from either direction during reciporcation thereof between end flow-reversing positions, as for example after completion of any stroke by the hydraulic drive means of the system, thereby making this arrangement especially useful for controlled operation of hydraulic presses and the like.

In order to retain the overbalance lever 158 in its "neutral" position as shown at 176 in Fig. 6, a locking lever 178 will be mounted by means of a pivotal connection 180 for free swinging movements substantially in a plane perpendicular to the plane of movement of the overbalance lever. The lever 178 will be formed to have an integral projecting lug portion 182 adapted to be rotated into engagement in a slot 184 provided in the lever 158 intermediate its ends as shown in Figs. 6 and 8 so as to allow continuous automatic operation of the apparatus of the invention in the hereinabove described manner.

It will also be appreciated that the shipper member 64 will be provided with a ball handle portion 186 at its outer end whereby the movements of the shipper rod may be manually controlled for further selective control of the operation of a hydraulic apparatus embodying a device of the invention.

Thus, as more fully explained hereinabove, the control means of the invention will provide highly selective control of a hydraulic system with maximum safety protection for utilization of the apparatus under various conditions. Also, while the embodiment of the invention shown and described refers to a hydraulic pressure system, it is apparent that the control means of the invention could just as readily be utilized in a similar manner to control performance in any similar fluid pressure system, as for example in one employing pneumatic pressures.

Therefore, it will be understood that although only one form of the invention has been shown and described in detail, it will be apparent to those skilled in the art that the invention is not so limited but that various changes and modifications may be made therein without departing from the spirit of the invention or the scope of the appended claims.

I claim:

1. In a hydraulic apparatus having a fluid motor of the piston and cylinder type, a control mechanism including a flow reversing reciprocating valve body element, a control member for said valve body element, pressure-responsive actuating means communicating with the fluid motor, pivotally mounted crank means having cam means at one end thereof, roller means spring-pressed against said cam means, said pressure-responsive means being in engagement with said crank means to cause arcuate motion thereof about its pivotal mounting when said roller means spring pressure is overcome by said cam means and said crank means engaging said control member whereby automatic reversal of flow in the hydraulic apparatus is accomplished in response to predetermined hydraulic pressure in said fluid motor.

2. In a hydraulic apparatus having a fluid motor of the piston and cylinder type, a control mechanism including a flow reversing valve body element controlling fluid flow to said motor and a control arm member therefor, relief valve means communicating with the fluid inlet to said valve body element and operable to relieve the fluid pressure in the hydraulic apparatus at a predetermined maximum pressure, pressure-responsive control arm member actuating means in communication with both sides of the piston in the fluid motor and being in engaged relation with said control arm member, control arm retaining means arranged to release said control arm member for movement at fluid motor pressures greater than normal operating pressures, and manually operable relief valve release means selectively operable to regulate the operating pressure in the fluid motor at any position of the piston therein.

3. In a hydraulic apparatus having a fluid motor, a control mechanism including a flow reversing valve body element, a control member for said valve body element, pressure-responsive means communicating with the fluid motor, a pivoted rocker member having cam means at one end thereof, and spring-pressed roller means engaging said rocker member cam means and biasing said rocker member against movement about its pivot, said pressure-responsive means being in lost motion engagement with said rocker member eccentrically of its pivot to cause arcuate actuation thereof when said roller means spring pressure is overcome and said rocker member being adapted to engage said control member, whereby automatic reversal of flow in the hydraulic apparatus is accomplished in response to hydraulic pressure in said fluid motor.

4. In a hydraulic apparatus having a fluid motor of the piston and cylinder type, a control mechanism including a flow reversing valve body element, a control member for said valve body element, pressure-responsive means communicating with the fluid motor, adjustable mounting means, crank means eccentrically pivoted on said mounting means and having cam means at one end thereof and having its opposite end engaging said control member, roller means being spring-pressed against said crank means cam means, said pressure-responsive means being in lost motion connection with said crank means to cause arcuate motion thereof about its pivotal mounting when said roller means spring pressure is overcome by said crank means cam means and said crank means engaging said control member whereby automatic reversal of flow in the hydraulic apparatus is accomplished in response to a predetermined hydraulic pressure in said fluid motor as when the piston thereof is at the end limits of its travel.

5. In a hydraulic apparatus in combination with a fluid motor of the piston and cylinder type, a control mechanism including a flow reversing valve body element controlling fluid flow to said motor and a control arm member, relief valve means communicating with the fluid inlet to said valve body element, pressure-responsive control arm member actuating means communicating with said motor, control arm member retaining means biasing said member against movement, and manually operable relief valve release means for selectively bleeding fluid from said valve body element inlet.

6. In combination with a fluid motor, a flow reversing valve unit controlling fluid flow to said motor and having a control arm portion, pressure-responsive actuating means communicating with the fluid motor and engaging said valve control arm portion for actuation thereof responsive to predetermined pressures in said fluid motor, means biasing said valve unit against reversing movement, whereby said valve unit is actuated only by fluid motor pressures greater than normal driving pressures therein, and means selectively operable to hold said valve unit in neutral position.

7. In a hydraulic apparatus in combination with a fluid motor, a flow reversing valve body element, a control member for said valve body element, actuating means responsive to pressures in said fluid motor, snap-lock means interconnecting said pressure-responsive actuating means and said control member, and relief valve means communicating with the fluid inlet to said valve body element and having manual control means for selectively bleeding off a portion of the fluid passing to said valve body element, whereby said fluid motor may be controlled independently of said valve control member.

8. In a hydraulic apparatus in combination with a fluid motor flow reversing valve body element having a reciprocating control arm, pressure-responsive actuating means, snap-lock means interconnecting said control arm and said actuating means, and manually controllable overbalance lever means comprising a lever member weighted at its upper end and having its lower end pivotally mounted adjacent said control arm, said lower end having spaced angularly related portions adapted to selectively engage said control arm in its neutral position from either direction of approach thereto when said lever is in overbalanced condition at the end limits of its movement.

9. In a hydraulic apparatus having a fluid motor, in combination, a flow reversing reciprocating valve having an actuating arm, adjustable control means selectively responsive to pressures in said hydraulic apparatus to cause automatic actuation of said actuating arm to alternate said valve, and overbalance control means comprising a lever member having a weighted end portion and angularly related shoulder portions adjacent the opposite end portion thereof, said lever member being pivotally mounted at said opposite end portion in the vicinity of said actuating arm for arcuate movement between end limits defined by said shoulder portions engaging said arm, said lever member being in overbalanced condition at each of said end limits and said actuating arm having selectively spaced shoulders to engage said lever member from either direction of approach when said valve is in its neutral condition.

10. In a hydraulic apparatus having a fluid motor, in combination, a control mechanism including a flow reversing reciprocating valve body unit having a control arm portion, pressure-responsive means communicating with the fluid motor and being in engagement with said control arm portion for actuation thereof responsive to pressures in said fluid motor, snap-lock means whereby said control arm portion is actuated only by fluid motor pressures greater than normal driving pressures therein, and overbalance lever means arranged to selectively stop and retain said control arm portion with said valve unit in its neutral position under the influence of gravitational force.

11. In an apparatus having a fluid motor, a control mechanism including a flow reversing valve body element controlling fluid flow to said motor, a control member for said valve body element, pressure-responsive actuating means communicating with the fluid motor, pivotally mounted rocker means having cam means at one end thereof and having its opposite end engaging said control member, and spring-pressed roller means engaging said rocker cam means to bias said rocker means against movement, said pressure-responsive means engaging said rocker means eccentrically of its pivotal mounting whereby automatic reversal of fluid flow is accomplished in the apparatus in response to a predetermined pressure in said fluid motor.

References Cited in the file of this patent

UNITED STATES PATENTS

| | | |
|---|---|---|
| 506,565 | Tennyson | Oct. 10, 1893 |
| 1,938,758 | Ernst | Dec. 12, 1933 |
| 2,018,215 | Lausen | Oct. 22, 1935 |
| 2,298,457 | Berges | Oct. 13, 1942 |
| 2,302,232 | MacNeil | Nov. 17, 1942 |
| 2,321,423 | Rogers | June 8, 1943 |
| 2,617,257 | Douglas | Nov. 11, 1952 |
| 2,619,938 | Larson et al. | Dec. 2, 1952 |